United States Patent
Kim et al.

(10) Patent No.: US 10,933,831 B2
(45) Date of Patent: Mar. 2, 2021

(54) AIRBAG SYSTEM FOR VEHICLE

(71) Applicants: Hyundai Motor Company, Seoul (KR); Kia Motors Corporation, Seoul (KR)

(72) Inventors: Jong Wook Kim, Gyeonggi-do (KR); Wook Jin, Seoul (KR); Yong Tae Kim, Gyeonggi-do (KR); Eung Man Kim, Gyeonggi-do (KR); Wan Dong Yoo, Gyeonggi-do (KR); Kim Dong Young, Gyeonggi-do (KR); Yong Hyun Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 25 days.

(21) Appl. No.: 16/201,450

(22) Filed: Nov. 27, 2018

(65) Prior Publication Data
US 2020/0101923 A1 Apr. 2, 2020

(30) Foreign Application Priority Data
Oct. 2, 2018 (KR) .......................... 10-2018-0117855

(51) Int. Cl.
| B60R 21/207 | (2006.01) |
| B60R 21/233 | (2006.01) |
| B60R 21/2338 | (2011.01) |
| B60R 21/231 | (2011.01) |
| B60R 21/00 | (2006.01) |
| B60R 21/16 | (2006.01) |

(52) U.S. Cl.
CPC .......... *B60R 21/207* (2013.01); *B60R 21/233* (2013.01); *B60R 21/2338* (2013.01); *B60R 21/23138* (2013.01); *B60R 2021/0048* (2013.01); *B60R 2021/161* (2013.01); *B60R 2021/23146* (2013.01); *B60R 2021/23308* (2013.01); *B60R 2021/23386* (2013.01)

(58) Field of Classification Search
CPC ............ B60R 21/207; B60R 21/23138; B60R 21/233
See application file for complete search history.

(56) References Cited

U.S. PATENT DOCUMENTS 3,655,217 A * 4/1972 Johnson ................ B60R 21/207
                                                                280/737
3,779,577 A * 12/1973 Wilfert .................. B60R 21/207
                                                              280/730.1

(Continued)

FOREIGN PATENT DOCUMENTS

DE    102009037279 A1 *  2/2011  ....... B60R 21/23138
KR    10-2010-0059563 A    6/2010

*Primary Examiner* — Faye M Fleming
(74) *Attorney, Agent, or Firm* — Mintz Levin Cohn Ferris Glovsky and Popeo, P.C.; Peter F. Corless (57) ABSTRACT

An airbag system for a vehicle is provided. The system includes an airbag cushion that is deployed from the upper portion of a seatback to cover the head of an occupant, thereby absorbing impacts applied to the head of the occupant and preventing neck bending attributable to movement of the head of the occupant. In addition, injury to the occupant is minimized by variably adjusting the deployment timing of the airbag cushion depending on the collision direction of the vehicle.

9 Claims, 6 Drawing Sheets

(56) References Cited

U.S. PATENT DOCUMENTS

| | | | | |
|---|---|---|---|---|
| 5,833,312 | A * | 11/1998 | Lenz | B60N 2/427 |
| | | | | 297/216.13 |
| 6,572,137 | B2 * | 6/2003 | Bossecker | B60R 21/207 |
| | | | | 280/730.1 |
| 7,484,753 | B2 * | 2/2009 | Sugimoto | B60R 21/207 |
| | | | | 280/730.1 |
| 7,878,531 | B2 * | 2/2011 | Sugimoto | B60R 21/207 |
| | | | | 280/730.1 |
| 9,533,651 | B1 * | 1/2017 | Ohno | B60R 21/23138 |
| 9,573,553 | B2 * | 2/2017 | Ko | B60R 21/233 |
| 9,944,246 | B2 * | 4/2018 | Ohno | B60R 21/23138 |
| 9,950,687 | B2 * | 4/2018 | Kato | B60R 21/207 |
| 10,202,095 | B2 * | 2/2019 | Ohno | B60R 21/231 |
| 10,315,606 | B2 * | 6/2019 | Ohno | B60R 21/207 |
| 10,471,920 | B2 * | 11/2019 | Dry | B60R 21/2165 |
| 10,518,733 | B2 * | 12/2019 | Dry | B60R 21/2338 |
| 2013/0015642 | A1 * | 1/2013 | Islam | B60R 21/207 |
| | | | | 280/730.1 |
| 2014/0327234 | A1 * | 11/2014 | Heurlin | B60R 21/207 |
| | | | | 280/730.1 |
| 2016/0347272 | A1 * | 12/2016 | Kato | B60R 21/207 |
| 2017/0028955 | A1 * | 2/2017 | Ohno | B60R 21/207 |
| 2017/0057456 | A1 * | 3/2017 | Ohno | B60R 21/23138 |
| 2019/0359420 | A1 * | 11/2019 | Skocypec | B65B 67/1238 |
| 2020/0156586 | A1 * | 5/2020 | Lin | B60R 21/013 |

\* cited by examiner

AIRBAG SYSTEM FOR VEHICLE

CROSS-REFERENCE TO RELATED APPLICATION

This application claims the priority benefit of Korean Patent Application No. 10-2018-0117855, filed on Oct. 2, 2018, the disclosure of which is incorporated herein by reference.

BACKGROUND

1. Field of the Invention

The present invention relates to an airbag system for a vehicle, and more particularly to an airbag system for a vehicle that protects an occupant's head during a vehicle collision.

2. Description of the Related Art

In addition to technologies regarding driving performance, convenience, and functionality of vehicles, technologies for securing the safety of occupants have also been developed. In particular, airbags, from among a variety of safety devices applied to vehicles, are applied as an effective device for preventing or reducing impacts applied to occupants.

Airbags protect drivers and passengers in the event of a vehicle collision and each include a crash sensor configured to detect a vehicle collision, a controller configured to operate the airbag based on the result detected by the crash sensor, and an airbag module configured to operate the airbag in response to signals from the controller. Airbags are typically classified into a driver airbag, a passenger airbag, a side airbag, a roof airbag, a curtain airbag, etc. according to the installation positions or objects to be protected.

In particular, as autonomous vehicles are commercialized, the occupant may be in a lying posture by reclining the seat back. However, when a head-on collision occurs while the occupant is lying down, the occupant may collide with the frontal airbag, and may then rebound therefrom. At this time, the occupant's neck may be excessively bent, which may cause injury to the occupant's neck. Further, when a side collision occurs while the occupant is lying down, the occupant's head may be positioned below the deployment range of the curtain airbag. Thus, the occupant may not be reliably protected.

The information disclosed in this section is merely for enhancement of understanding of the general background of the invention and should not be taken as an acknowledgement or any form of suggestion that this information forms the prior art already known to a person skilled in the art.

SUMMARY

Therefore, the present invention provides an airbag system for a vehicle, which may protect an occupant's head from impact and prevent the head from being tilted during a vehicle collision.

In accordance with the present invention, the above and other objects may be accomplished by the provision of an airbag system for a vehicle that may include an airbag cushion installed to an upper portion of a seatback, the airbag cushion being configured to be deployed upwards by receiving gas from an inflator to correspond to the head of an occupant, and having a deployment shape that covers the head of the occupant to absorb impacts applied to the head of the occupant and prevent the head of the occupant from being tilted by restraining a position of the head of the occupant.

The airbag cushion may include a main chamber configured to be inflated by receiving gas from the inflator and to be deployed upwards from the upper portion of the seatback to correspond to the head of the occupant, and a side chamber configured to be inflated by receiving gas from the main chamber and formed to be bent and extend from each of both sides of the main chamber to cover the head of the occupant upon inflation. A side-dead zone may be formed at the center of a connection portion between the main chamber and the side chamber. The side-dead zone may be sealed to prevent gas from passing therethrough.

The airbag system may further include an upper chamber configured to be inflated by receiving gas from the main chamber and formed to be bent and extend from the upper end of the main chamber to be deployed above the head of the occupant upon inflation. An upper-dead zone may be formed at the center of a connection portion between the main chamber and the upper chamber. The upper-dead zone may be sealed to prevent gas from passing therethrough. The upper chamber and the side chamber may be connected to each other via a fixing tether and thus, the upper chamber and the side chamber may be deployed to cover the head of the occupant upon inflation.

The side chamber may be formed at each of both sides of the main chamber, and a plurality of fixing tethers may be provided. Each fixing tether may be connected to a corresponding one of both sides of the upper chamber and may be connected to the side chamber disposed adjacent to the corresponding one of both sides of the upper chamber. Additionally, the airbag system may include a connection chamber that extends from the lower end of the main chamber to be connected with the inflator disposed at the upper portion of the seatback. The connection chamber may be deployed toward the head of the occupant from the seatback and may then be bent upwards upon inflation.

Further, the connection chamber may include a first extending portion that extends from the upper portion of the seatback toward the occupant, a bent portion bent and extending upwards from the first extending portion, and a second extending portion that extends upwards from the bent portion. The connection chamber may be provided therein with a shape-maintaining diaphragm. The shape-maintaining diaphragm may include a first diaphragm disposed in a connection portion between the first extending portion and the bent portion, a second diaphragm disposed in a connection portion between the bent portion and the second extending portion, and a third diaphragm disposed in a connection portion between the second extending portion and the main chamber. The connection chamber may be bent and extend upwards from the upper portion of the seatback upon inflation. Each of the first diaphragm, the second diaphragm and the third diaphragm may include at least one aperture through which gas supplied from the inflator may pass.

The airbag system may further include a controller configured to receive information regarding a vehicle collision and to execute deployment of the airbag cushion. In response to determining that a side collision will occur, the controller may be configured to immediately deploy the airbag cushion. In response to determining that a head-on collision will occur, the controller may be configured to delay deployment of the airbag cushion.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Reference will now be made in detail to the exemplary embodiments of the present invention, examples of which are illustrated in the accompanying drawings. Wherever possible, the same reference numbers will be used throughout the drawings to refer to the same or like parts.

Figure 1:
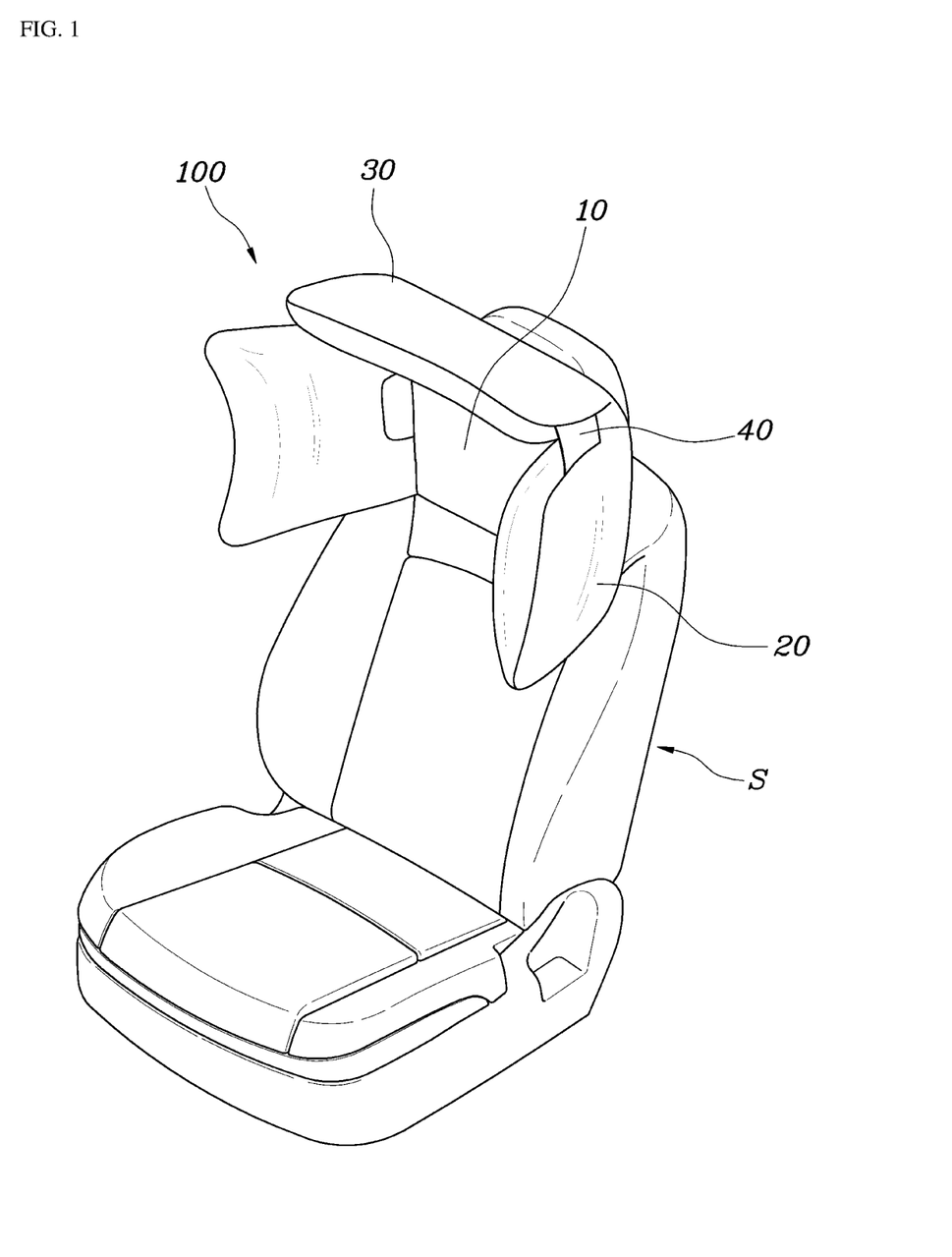
FIG. 1 is a view illustrating an airbag system for a vehicle according to an exemplary embodiment of the present invention.

FIG. 1 is a view illustrating an airbag system for a vehicle according to an exemplary embodiment of the present invention, and FIGS. 2 to 6 are views concretely illustrating the airbag system for a vehicle illustrated in FIG. 1.

Figure 2:
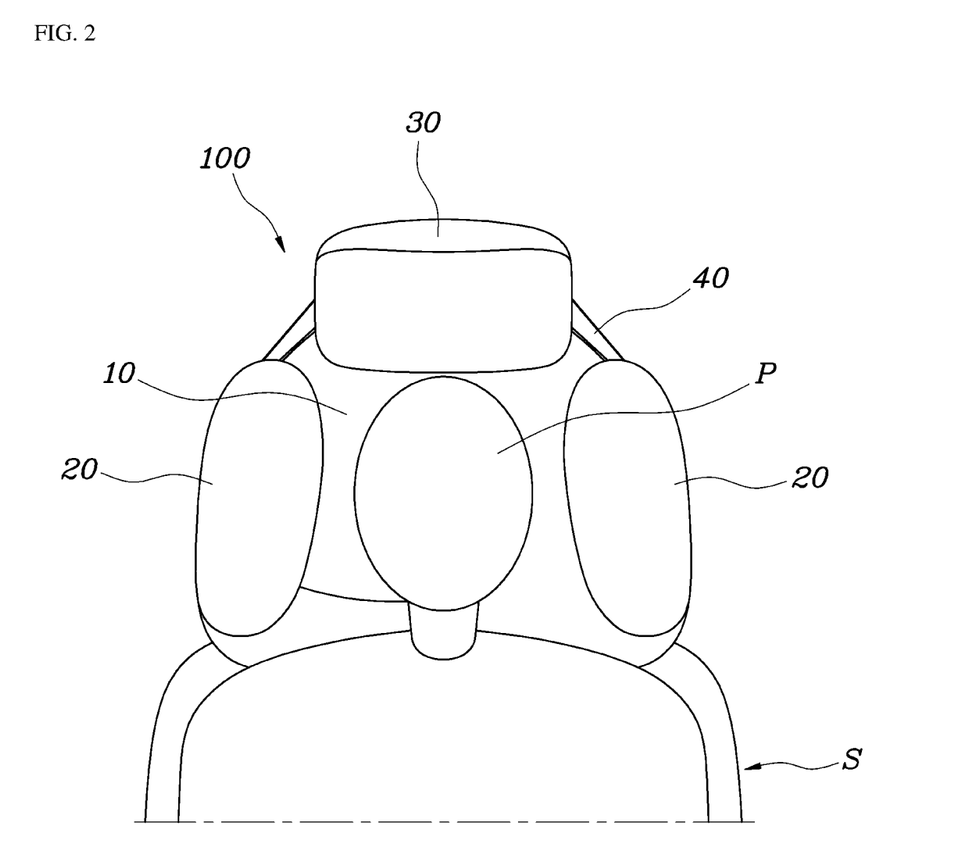
FIGS. 2 to 6 are views concretely illustrating the airbag system for a vehicle illustrated in FIG. 1 according to an exemplary embodiment of the present invention.
Figure 3:
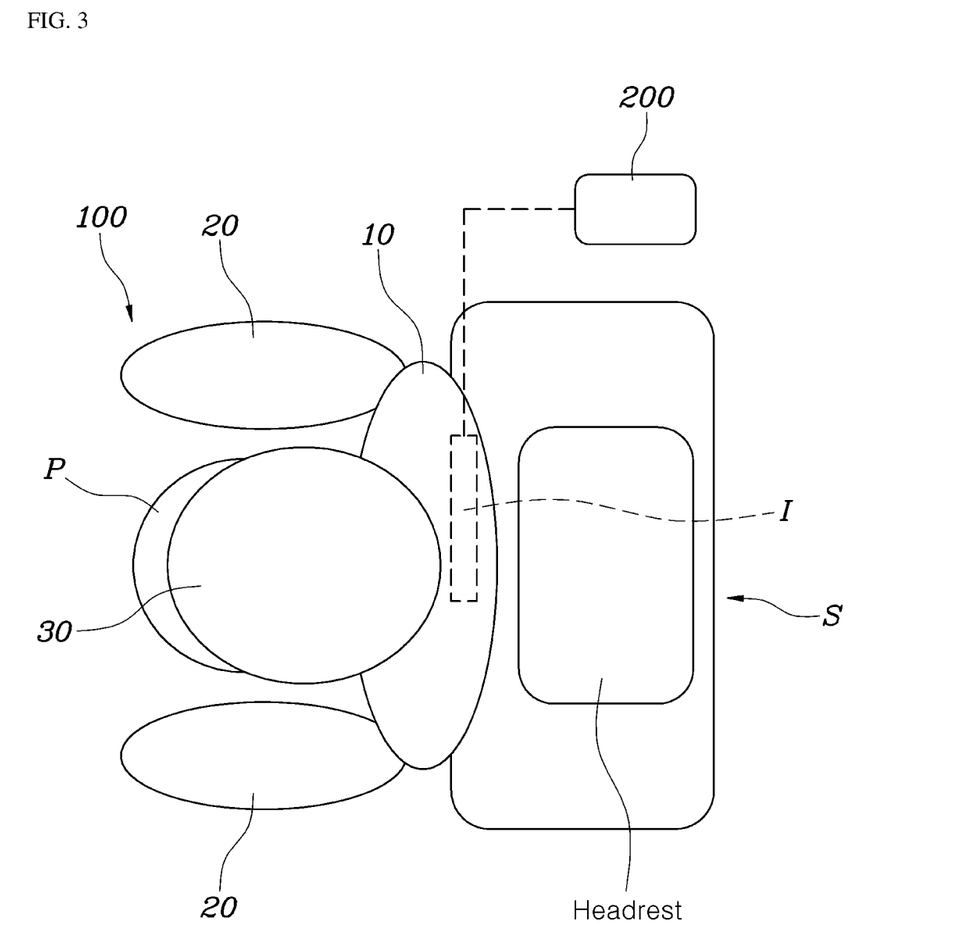

As illustrated in FIGS. 1 to 3, the airbag system for a vehicle according to the exemplary embodiment of the present invention may include an airbag cushion 100 installed to the upper portion of a seatback S and configured to be deployed upwards by receiving gas from an inflator I to correspond to the head of an occupant P, and the airbag cushion may have a deployment shape that covers the head of the occupant P to protect the head of the occupant P from impact and prevent the head of the occupant P from being tilted by restraining the position of the head of the occupant P.

Particularly, the airbag cushion 100 of the present invention may be installed to the upper portion of the seatback S and may be arranged to correspond to the back of the head of the occupant P when deployed upwards. The airbag cushion 100 may be deployed by receiving gas from the inflator I. The inflator I may be installed to the upper portion of the frame of the seatback S together with the airbag cushion 100. The airbag cushion 100 may have a deployment shape that covers the head of the occupant P. Thus, when deployed, the airbag cushion 100 may be configured to absorb impacts applied to the sides or back of the occupant P, and cover and restrain the head of the occupant P, thereby preventing the neck of the occupant P from being bent or tilted.

As described above, the airbag cushion 100 of the present invention may protect the head of the occupant P. In particular, the airbag cushion 100 may be rapidly deployed from the upper portion of the seatback S to a position that corresponds to the head of the occupant P to cover the head of the occupant P, thereby safely protecting the occupant P from impact-caused injury or neck-bending-caused injury. As illustrated in FIGS. 2 and 3, the airbag cushion 100 may include a main chamber 10, which is configured to be inflated by receiving gas from the inflator I and to be deployed upwards from the upper portion of the seatback S to correspond to the back of the head of the occupant P, and a side chamber 20 configured to be inflated by receiving gas from the main chamber 10 and formed to be bent and extend from each of both sides of the main chamber 10 to cover the head of the occupant P upon inflation.

As described above, the airbag cushion 100 may include the main chamber 10 and the side chamber 20. The main chamber 10 may be deployed upwards from the upper portion of the seatback S and may have a predetermined area, and may be arranged to correspond to the back of the head of the occupant P. The side chamber 20 deployed from each of both sides of the main chamber 10 may be inflated by receiving gas from the main chamber 10 and to have a predetermined area, and may be arranged at each side of the head of the occupant P.

Figure 4:
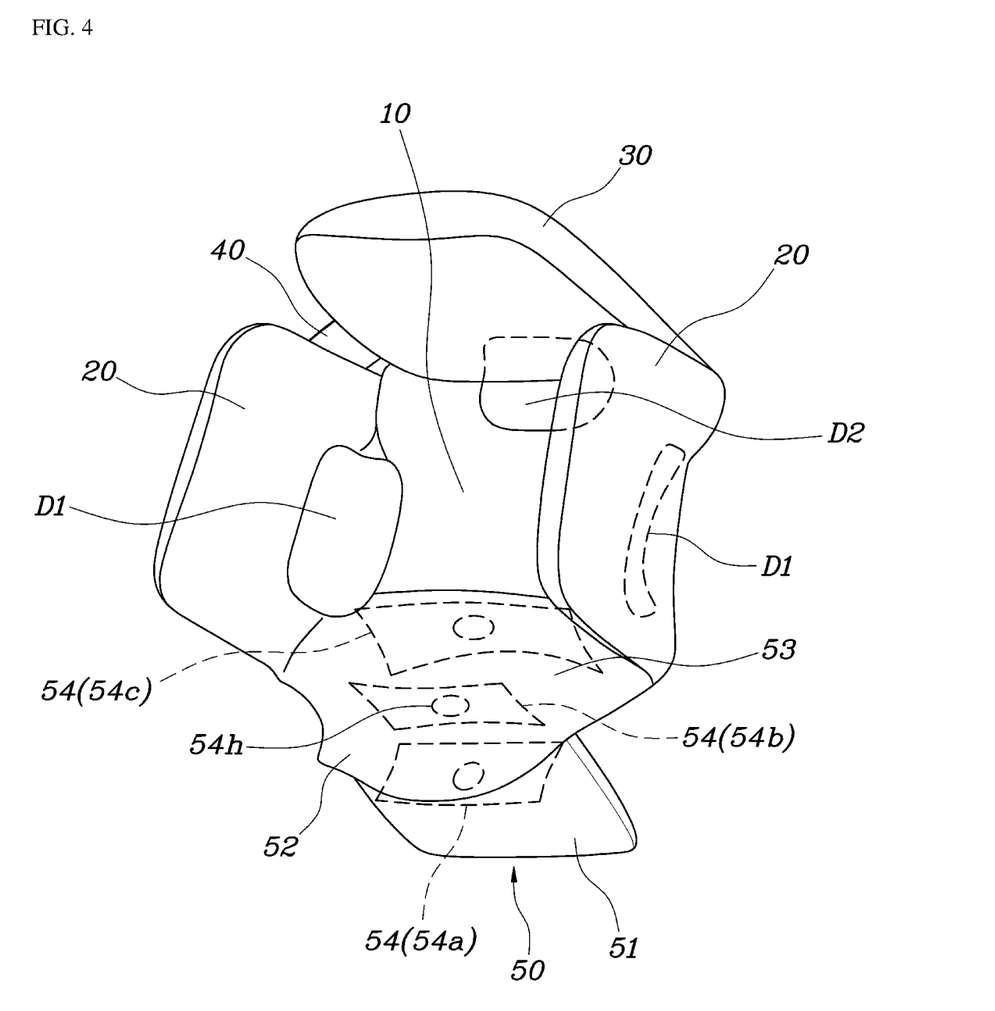

A side-dead zone D1, which is sealed to prevent gas from passing therethrough, may be formed at the center of the connection portion between the main chamber 10 and the side chamber 20. As illustrated in FIG. 4, the side-dead zone D1, which is formed at the connection portion between the main chamber 10 and the side chamber 20, may enable the side chamber 20 to be bent and deployed from the main chamber 10 more easily in the direction of covering the head of the occupant P. In addition, the side-dead zone D1, which is formed at the connection portion between the main chamber 10 and the side chamber 20, may reduce the volume of each chamber and increase the deployment speed of each chamber. In addition, gas moves through the regions above and below the side-dead zone D1, which may enable smoother inflation of the side chamber 20.

As illustrated in FIGS. 1 to 3, the airbag cushion 100 may further include an upper chamber 30 configured to be inflated by receiving gas from the main chamber 10 and may be formed to be bent and extend from the upper end of the main chamber 10 to be deployed above the head of the occupant P upon inflation.

The upper chamber 30 may be arranged above the head of the occupant P to be bent and deployed from the upper end of the main chamber 10 to the region above the head of the occupant P, and may be formed to have a predetermined area. Thus, when the occupant P rebounds upwards and downwards during a vehicle collision or rollover, the upper chamber 30 may be configured to absorb impacts applied to the top of the head of the occupant P, and may cover and restrain the head of the occupant P together with the side chamber 20 to prevent neck bending or tilting.

An upper-dead zone D2, which is sealed to prevent gas from passing therethrough, may be formed at the center of the connection portion between the main chamber 10 and the upper chamber 30. As illustrated in FIG. 4, the upper-dead zone D2, which is formed at the connection portion between the main chamber 10 and the upper chamber 30, may enable the upper chamber 30 to be bent and deployed from the upper end of the main chamber 10 more easily in the direction of covering the head of the occupant P.

In addition, the upper-dead zone D2, which is formed at the connection portion between the main chamber 10 and the upper chamber 30, may reduce the volume of each chamber and increase the deployment speed of each chamber. In addition, gas moves through both side regions of the upper-dead zone D2, which may enable smoother inflation of the upper chamber 30. With the above-described configuration, during a vehicle collision, the side chamber 20 and the upper chamber 30, which extend from the main chamber 10, may protect the head of the occupant P from impact by covering the head of the occupant, and may prevent neck-bending-caused injury by minimizing the movement of the head of the occupant P.

As illustrated in FIGS. 1 and 4, the upper chamber 30 and the side chamber 20 may be connected to each other via a fixing tether 40 and thus, the upper chamber 30 and the side chamber 20 may be deployed to cover the head of the occupant P upon inflation. In other words, the fixing tether 40, which connects the upper chamber 30 and the side chamber 20 to each other, may allow the upper chamber 30 and the side chamber 20 to be deployed in the direction of covering the head of the occupant P while preventing the upper chamber 30 and the side chamber 20 from being moved in an unspecific direction when the airbag cushion 100 is deployed. Since the fixing tether 40 connects each of both sides of the upper chamber 30 and the upper end of the side chamber 20 to each other, the fixing tether 40 may provide pulling force to cause the upper chamber 30 and the side chamber 20 to be bent in the direction of covering the head of the occupant P without spreading outwards when the airbag cushion 100 is deployed. Therefore, the airbag cushion 100 may be deployed in a shape that covers the entire head of the occupant P.

In particular, a plurality of fixing tethers 40 may be provided, and each of the plurality of fixing tethers 40 may be connected to a respective one of both sides of the upper chamber 30 (e.g., a first side of the upper chamber), and may also be connected to a respective adjacent one of the side chambers 20, which are formed at both sides of the main chamber 10. Accordingly, a pair of side chambers 20 may be connected to a single upper chamber 30. Thus, when the airbag cushion 100 is deployed, the upper chamber 30, which is supposed to be deployed upwards, and the side chambers 20, which are supposed to be deployed in both lateral directions, may gather around the main chamber 10 due to the pulling force of the fixing tethers 40. As a result, the airbag cushion 100 may be deployed in a shape that covers the entire head of the occupant P.

Figure 5:
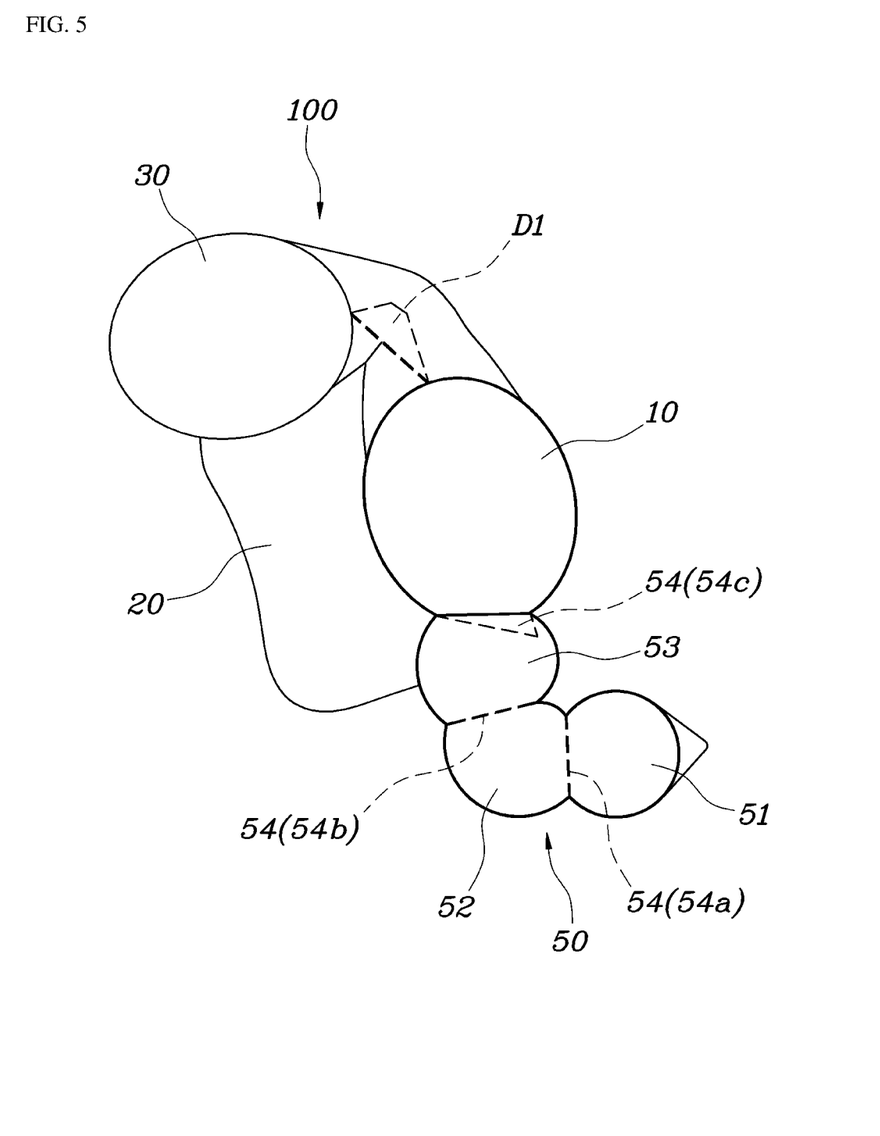
Figure 6:
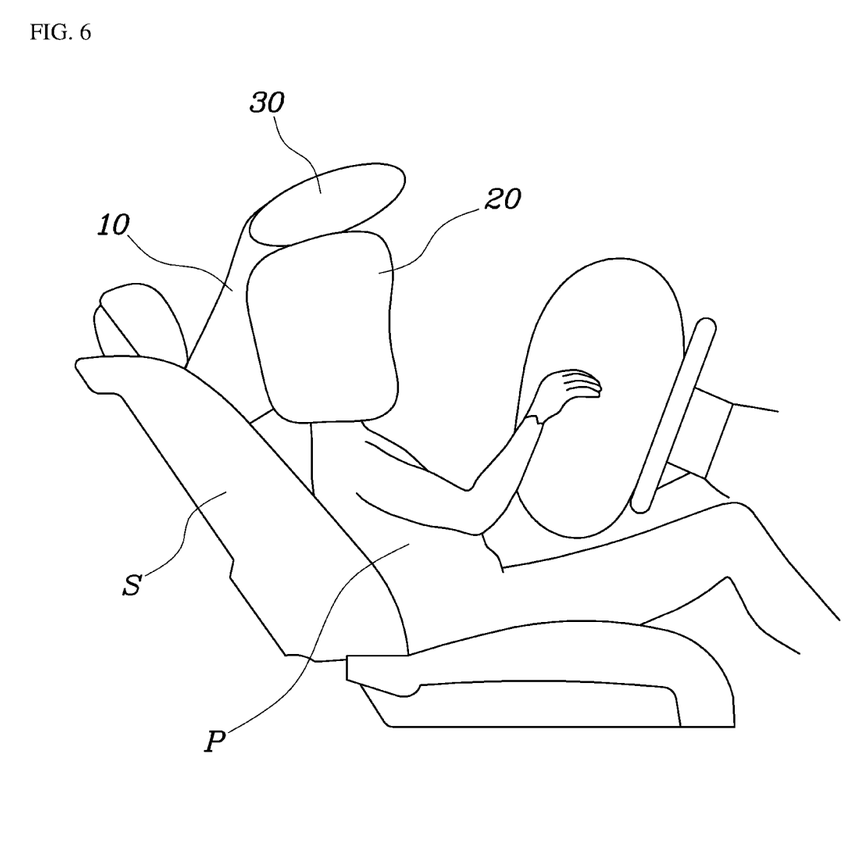

As illustrated in FIGS. 4 to 6, the airbag cushion 100 may further include a connection chamber 50, which extends from the lower end of the main chamber 10 to be connected with the inflator I disposed at the upper portion of the seatback S, and which may be deployed toward the head of the occupant P from the seatback S and then may be bent upwards when inflated. Specifically, the connection chamber 50 may be deployed below the main chamber 10, and may be bent upwards to position all chambers including the main chamber 10 behind the head of the occupant P. The connection chamber 50 may be installed to the upper portion of the seatback S and may be configured to receive gas from the inflator I and to be deployed with a predetermined area to support the neck of the occupant P.

Therefore, during a vehicle collision, gas may be supplied to the connection chamber 50 from the inflator I, and may be subsequently moved to the main chamber 10 and the other chambers via the connection chamber 50. The connection chamber 50 may thus be deployed to be bent upwards, and accordingly all chambers including the main chamber 10 may be positioned to correspond to the head of the occupant P. In addition, the connection chamber 50 supports the neck of the occupant P, thereby absorbing impacts applied to the neck and preventing neck bending. In particular, the connection chamber 50 may include a first extending portion 51, which extends from the upper portion of the seatback S toward the occupant P, a bent portion 52, which is bent and extends upwards from the first extending portion 51, and a second extending portion 53, which extends upwards from the bent portion 52.

In addition, the connection chamber 50 may include a shape-maintaining diaphragm 54, which includes a first diaphragm 54a disposed in the connection portion between the first extending portion 51 and the bent portion 52, a second diaphragm 54b disposed in the connection portion between the bent portion 52 and the second extending portion 53, and a third diaphragm 54c disposed in the connection portion between the second extending portion 53 and the main chamber 10. Therefore, the connection chamber 50 may be bent and extend upwards from the upper portion of the seatback S upon inflation.

In other words, as illustrated in FIG. 5, since the first extending portion 51, the bent portion 52 and the second extending portion 53, which form the connection chamber 50, may be connected to each other in an "L" shape, the main chamber 10 may be deployed upwards from the seatback S, and may be positioned to correspond to the head of the occupant P. The shape of the connection chamber 50 may be maintained and thus, the region from the first extending portion 51 to the bent portion 52 may extend straight due to the first diaphragm 54a disposed in the connection portion between the first extending portion 51 and the bent portion 52 and thus, the region from the bent portion 52 to the second extending portion 53 may extend upwards due to the second diaphragm 54b disposed in the connection portion between the bent portion 52 and the second extending portion 53.

Further, due to the third diaphragm 54c disposed in the connection portion between the second extending portion 53 and the main chamber 10, the main chamber 10 may be maintained in the upwardly deployed state. Each of the first diaphragm 54a, the second diaphragm 54b and the third diaphragm 54c may include at least one aperture 54h, through which gas supplied from the inflator I may pass. Therefore, gas supplied from the inflator I may move to the first extending portion 51, the bent portion 52 and the second extending portion 53 through the aperture 54h formed in each of the diaphragms.

As the connection chamber 50 is deployed in an "L" shape by the shape-maintaining diaphragm 54, the main chamber 10 connected to the connection chamber 50 may be guided to be deployed upwards and may be positioned behind the head of the occupant P. Therefore, all chambers including the main chamber 10 may safely cover the head of the occupant P. In addition, the connection chamber 50 supports the neck of the occupant P, thereby preventing the neck of the occupant P from being bent forwards and backwards and consequently mitigating injury to the occupant P.

The airbag system for a vehicle according to the exemplary embodiment of the present invention may further include a controller 200 configured to receive information regarding a vehicle collision and to execute the deployment of the airbag cushion 100. In response to determining that a side collision will occur (e.g., in response to predicting a side collision), the controller 200 may be configured to immediately the airbag cushion 100, and in response to determining that a head-on collision will occur, the controller 200 may be configured to delay deployment of the airbag cushion 100. The information regarding a vehicle collision may be V2V communication, V2I communication, or may be information received from various sensors mounted within the vehicle configured to detect surrounding vehicles and objects.

In particular, the controller 200 may be configured to detect a vehicle collision using various crash sensors, such as an infrared sensor, an ultrasonic sensor and an impact sensor mounted within the vehicle, and determine the operation timing of the inflator I to execute the deployment of the airbag cushion 100. Accordingly, in response to determining that a side collision will occur, the controller 200 may be configured to immediately deploy the airbag cushion 100 to protect the occupant P from impacts and glass fragments generated at the side of the vehicle and to prevent the neck of the occupant P from being bent due to inertia attributable to the side collision by rapidly restraining the head of the occupant P.

On the other hand, in response to determining that a head-on collision will occur, the controller 200 be configured to delay the deployment of the airbag cushion 100. In other words, the airbag cushion 100 may be operated to be deployed at the time point at which the body of the occupant P moves back after moving forwards due to inertia attributable to the head-on collision, thereby absorbing impact caused by collision of the occupant P with the seat and preventing neck bending attributable to subsequent vibration of the vehicle by covering and restraining the head of the occupant P. The deployment timing of the airbag cushion 100 may be stored in advance, and may vary based on the collision time, collision direction, etc.

The controller 200 may be further configured to receive more information regarding the angle of the seatback S. When the angle of the seatback S is adjusted to a set angle, the controller 200 may be configured to execute the deployment of the airbag cushion 100. Particularly, the set angle may be the angle to which the seatback S is pushed back. When the angle of the seatback S is adjusted to the set angle, more injury may be caused to the occupant P during a vehicle collision. However, even when the angle of the seatback S is adjusted to the set angle or greater, it may be possible to safely protect the occupant P through the above-described control of the airbag cushion 100.

As is apparent from the above description, the present invention provides an airbag system for a vehicle, in which an airbag cushion may be deployed from the upper portion of a seatback to cover the head of an occupant, thereby absorbing impacts applied to the head of the occupant and preventing neck bending attributable to movement of the head of the occupant. In addition, it may be possible to minimize injury to the occupant by variably adjusting the deployment timing of the airbag cushion depending on the collision direction of the vehicle.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. An airbag system for a vehicle, comprising:
   an airbag cushion installed to an upper portion of a seatback,
   wherein the airbag cushion is configured to be deployed upwards by receiving gas from an inflator to correspond to a head of an occupant, and has a deployment shape that covers the head of the occupant to absorb impacts applied to the head of the occupant and prevent the head of the occupant from being tilted by restraining a position of the head of the occupant;
   wherein the airbag cushion includes:
      a main chamber configured to be inflated by receiving gas from the inflator and to be deployed upwards from the upper portion of the seatback to correspond to the head of the occupant; and
      a side chamber configured to be inflated by receiving gas from the main chamber and formed to be bent and extend from each of both sides of the main chamber to cover the head of the occupant upon inflation
      an upper chamber configured to be inflated by receiving gas from the main chamber and formed to be bent and extend from an upper end of the main chamber to be deployed above the head of the occupant upon inflation, and
   wherein the upper chamber and the side chamber are connected to each other via a fixing tether to cause the upper chamber and the side chamber to be deployed to cover the head of the occupant upon inflation.
2. The airbag system according to claim 1, wherein a side-dead zone is formed at a center of a connection portion between the main chamber and the side chamber, the side-dead zone being sealed to prevent gas from passing therethrough.
3. The airbag system according to claim 1, wherein an upper-dead zone is formed at a center of a connection portion between the main chamber and the upper chamber, the upper-dead zone being sealed to prevent gas from passing therethrough.
4. The airbag system according to claim 1, wherein the side chamber is formed at each of both sides of the main chamber, and wherein a plurality of fixing tethers are provided, each fixing tether being connected to a corresponding one of both sides of the upper chamber and connected to the side chamber disposed adjacent to the corresponding one of both sides of the upper chamber.
5. The airbag system according to claim 1, further comprising:
   a connection chamber that extends from a lower end of the main chamber to be connected with the inflator disposed at the upper portion of the seatback, the connection chamber being deployed toward the head of the occupant from the seatback and then being bent upwards upon inflation.
6. The airbag system according to claim 5, wherein the connection chamber includes:
   a first extending portion that extends from the upper portion of the seatback toward the occupant;
   a bent portion bent and extending upwards from the first extending portion; and
   a second extending portion that extends upwards from the bent portion.
7. The airbag system according to claim 6, wherein the connection chamber includes a shape-maintaining diaphragm and the shape-maintaining diaphragm includes:

a first diaphragm disposed in a connection portion between the first extending portion and the bent portion;
a second diaphragm disposed in a connection portion between the bent portion and the second extending portion; and
a third diaphragm disposed in a connection portion between the second extending portion and the main chamber, and
wherein the connection chamber is bent and extends upwards from the upper portion of the seatback upon inflation.

8. The airbag system according to claim 7, wherein each of the first diaphragm, the second diaphragm and the third diaphragm includes at least one aperture through which gas supplied from the inflator passes.

9. The airbag system according to claim 1, further comprising:
a controller configured to receive information regarding a vehicle collision and to execute deployment of the airbag cushion,
wherein in response to determining that a side collision will occur, the controller is configured to immediately deploy the airbag cushion, and
wherein in response to determining that a head-on collision will occur, the controller is configured to delay deployment of the airbag cushion.

* * * * *